(No Model.)
C. NICHOLSON.
COMBINED HAND AND SPRING MOTOR.
No. 357,222. Patented Feb. 8, 1887.
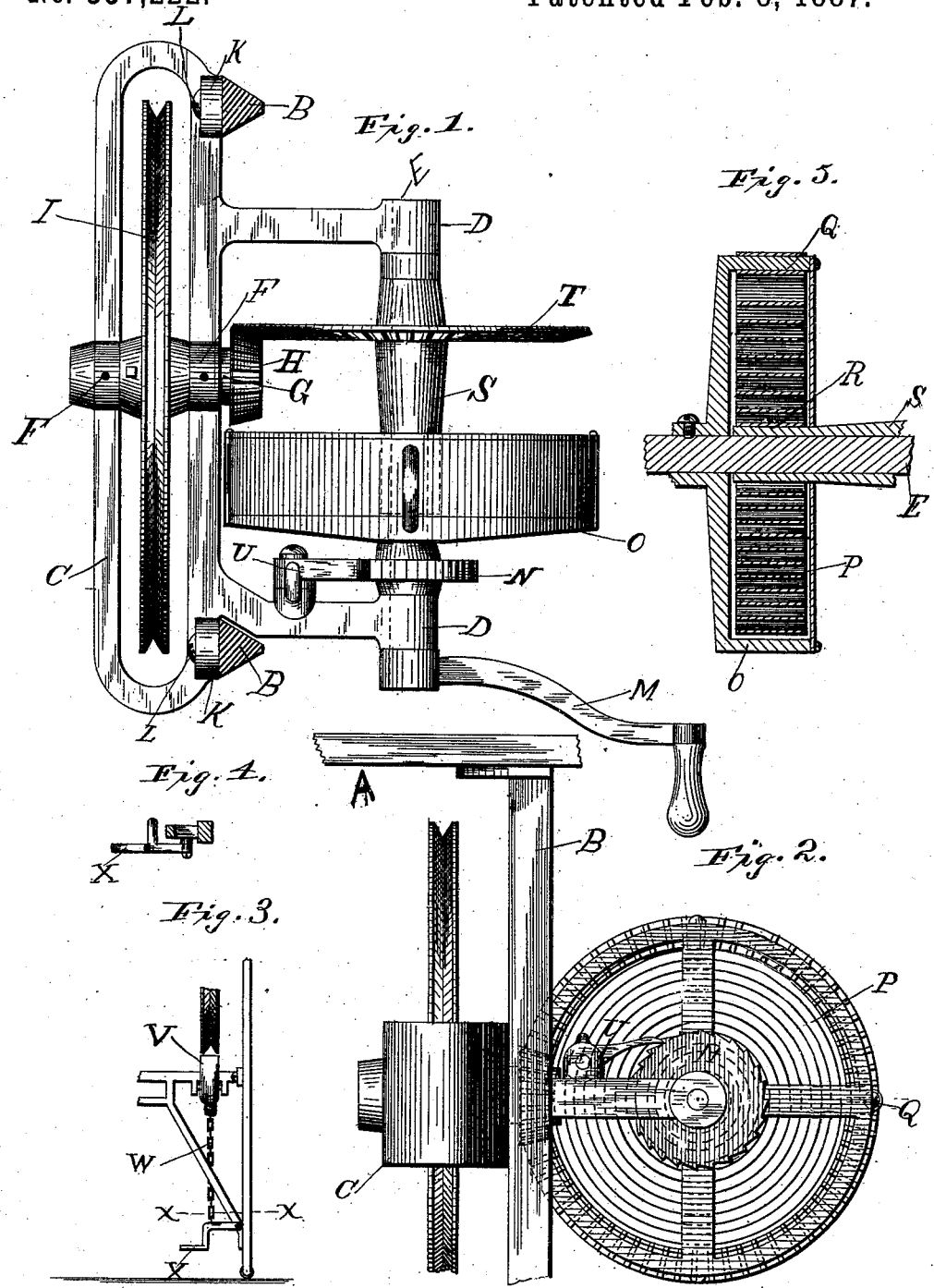

UNITED STATES PATENT OFFICE.

CHARLES NICHOLSON, OF PHILADELPHIA, PA., ASSIGNOR TO THE NICHOLSON STORAGE AND SPRING MOTOR COMPANY, OF WASHINGTON, D. C.

COMBINED HAND AND SPRING MOTOR.

SPECIFICATION forming part of Letters Patent No. 357,222, dated February 8, 1887.

Application filed August 18, 1885. Renewed April 2, 1886. Serial No. 197,582. (No model.)

*To all whom it may concern:*

Be it known that I, CHARLES NICHOLSON, of Philadelphia, in the county of Philadelphia and State of Pennsylvania, have invented a certain new and Improved Combined Hand and Spring Motor for Sewing-Machines and other Light Machinery; and I do hereby declare the following to be a full, clear, and exact description of the same, reference being had to the accompanying drawings, and to the figures and letters of reference marked thereon.

My invention has for its object to provide a cheap and simple motor for driving light machinery in general, and particularly sewing-machines; and it consists in certain novel features of construction and combinations of parts, which will be hereinafter fully described and claimed.

In the accompanying drawings, Figure 1 represents a top plan view of my invention; Fig. 2, a front view of the same; Figs. 3 and 4, detail views of the brake apparatus for stopping the motor or lessening its speed. Fig. 5 is a view showing the connection of the inner end of the spring to the hub of the gear-wheel.

Similar letters of reference in the several figures denote the same parts.

Inasmuch as my invention is intended particularly for use in driving sewing-machines, I have illustrated it as applied to such a machine.

The letter A indicates the top of the sewing-machine table, and B the legs thereof.

C is a metal frame, in which the operative parts of the motor are mounted. This frame is provided with journals or bearings D D for a main shaft, E, and with other bearings, F F, for a short shaft, G, which carries a pinion, H, and the belt-wheel I. Said frame is further provided with vertical lugs or flanges K K, which are connected by means of screws or bolts L L to the legs B of the table, as shown in Fig. 1.

The main shaft E extends from bearing D to bearing D, and its outer end is adapted to receive a crank or turning-handle, M. Upon it are mounted and secured by a key or otherwise, so as to rotate with it, a ratchet-wheel, N, and a frame or casing, O. The casing O is closed on all sides, and contains a volute spring, P, the outer end of which is secured to the casing at Q, while its inner end is secured at R to the hub S of a large bevel gear-wheel, T, that is mounted upon the shaft E, and extends within the spring-case, as shown in Fig. 1. The bevel-gear T meshes into the corresponding bevel-pinion, H, before referred to. One of the sides of the spring-casing is made removable in order to enable the spring to be conveniently applied. It is of course not essential that the spring be entirely inclosed; but I prefer to do so, as dust is thereby excluded from the convolutions of the spring, and the latter works much more effectively.

Upon one arm of the main frame of the attachment is mounted a pawl, U, which co-operates with the ratchet-wheel N and prevents the rotation of the latter, save in one direction.

The frame C incloses the belt-wheel I and forms a guard to it, as shown in Fig. 1.

Pivoted to one of the cross-pieces of the sewing-machine frame is a brake-shoe, V, the upper or heavier arm of which is adapted to bear upon the periphery of the belt-wheel when its lower arm is pulled down by means of a rod or chain, W, connected to a treadle, X, within convenient reach of the operator's foot.

The operation of the motor is as follows: When the operator wishes to start the machine, he makes one or more quick revolutions of the main shaft E by means of the handle M. This rotates the spring-case O and causes the spring to be wound up from the outside, its inner end then acting upon the hub S and causing the gear-wheel T, and through it the pinion H and belt-wheel I, to be set in rapid motion, the power of the wheel I being communicated by a suitable belt to the mechanism of a sewing-machine. As will be seen, the spring-case is prevented from any backward rotation by means of the pawl and ratchet U N. These two instrumentalities operate to instantly check it as soon as the operating crank or handle is released. Nor does the said operating crank or handle rotate backward for the same reason. This is important, since if the handle did move while the unwinding of the spring was taking place it would be very much in the way of the operator. When the gear-wheels are in motion, they operate practically noiselessly, as the tension of the spring causes all lost motion between them to be taken up.

It will be noticed that from the peculiar arrangement of parts the spring is wound up from the outside by the operation of the handle, while at the same time it unwinds at the inside and puts in motion the gear-wheels. In other words, the motion of the crank is communicated directly through the spring to the gearing to be operated. From this it results that the crank may be operated continuously, if desired, and the spring be relied upon to compensate for any irregularity in the speed with which the crank is turned, or, as before indicated, the crank may be turned two or three times at intervals and then released, and the spring alone relied upon to move the gearing, and thus enable the operator to employ both hands in manipulating the work.

The brake may be operated by the operator's foot to check or control the speed of the motor, as desired.

Having thus described my invention, I claim as new—

1. In the herein-described motor, the frame C, inclosing and forming a guard for the belt-wheel and having the bearings D D for the main shaft, the bearings F F for the belt-wheel shaft, and the lugs for attachment to a sewing-machine frame, substantially as described.

2. The combination, with the frame of the motor, of the main through-shaft and its operating crank or handle, the spring-case secured to and rotating with said shaft, the gear-wheel having the elongated hub, and the spring secured at its outer end to the spring-case and at its inner end to the said elongated hub, substantially as described.

3. The combination of the motor-frame, the through-shaft and its crank or handle, the spring-case and the ratchet-wheel secured to and rotating with said shaft, the gear-wheel having the elongated hub, the spring, connected as described, and the pawl for engaging the ratchet, the whole constructed and arranged substantially as described.

4. The combination of the main through-shaft, the spring-case secured to said shaft and rotating with it, the volute spring, connected as described, the large gear-wheel mounted upon the through-shaft and having the elongated hub, the small pinion and its shaft, and the belt-wheel, substantially as described.

5. The combination, with the main through-shaft and the spring-case secured to it, of the main gear having the elongated hub, the volute spring through which the motion of the main shaft is communicated through said elongated hub to the gear-wheels and belt-wheel, and the brake, constructed substantially as described, for checking the motion of the belt-wheel when propelled by said mechanism, substantially as described.

CHAS. NICHOLSON.

Witnesses:
  A. S. STEUART,
  THOMAS DURANT.